United States Patent
Shimura et al.

(12) 
(10) Patent No.: US 12,540,125 B2
(45) Date of Patent: Feb. 3, 2026

(54) METHOD FOR PRODUCING ETHYLENE OXIDE

(71) Applicant: Chiyoda Corporation, Yokohama (JP)

(72) Inventors: Mitsunori Shimura, Yokohama (JP); Dai Takeda, Yokohama (JP); Jun Matsumoto, Yokohama (JP)

(73) Assignee: CHIYODA CORPORATION, Kanagawa (JP)

( * ) Notice: Subject to any disclaimer, the term of this patent is extended or adjusted under 35 U.S.C. 154(b) by 490 days.

(21) Appl. No.: 18/022,767

(22) PCT Filed: Sep. 1, 2020

(86) PCT No.: PCT/JP2020/033124
§ 371 (c)(1),
(2) Date: Feb. 23, 2023

(87) PCT Pub. No.: WO2022/049638
PCT Pub. Date: Mar. 10, 2022

(65) Prior Publication Data
US 2025/0320187 A1    Oct. 16, 2025

(51) Int. Cl.
*C07D 301/10* (2006.01)
(52) U.S. Cl.
CPC .................. *C07D 301/10* (2013.01)
(58) Field of Classification Search
CPC ...................................... C07D 301/10
USPC .......................................... 549/534
See application file for complete search history.

(56) References Cited

FOREIGN PATENT DOCUMENTS

| | | |
|---|---|---|
| CN | 101102832 A | 1/2008 |
| CN | 108541277 A | 9/2018 |
| EP | 2980082 A1 | 2/2016 |
| JP | S61103544 A | 5/1986 |
| JP | 2001172272 A | 6/2001 |
| JP | 2018168410 A | 11/2018 |
| TW | 201439073 A | 10/2014 |

(Continued)

OTHER PUBLICATIONS

Office Action for Taiwan Patent Application No. 110131659 received Mar. 23, 2022; 10 pp.

(Continued)

*Primary Examiner* — Taylor V Oh
(74) *Attorney, Agent, or Firm* — Armstrong Teasdale LLP

(57) ABSTRACT

A method for producing ethylene oxide includes an ethylene oxide generation step 1 in which a first mixture containing ethylene oxide is obtained by causing ethylene and oxygen to react in presence of a diluent gas; a gas-liquid separation step 2 in which the first mixture is gas-liquid separated into a second mixture containing ethylene, oxygen, and carbon dioxide and a third mixture containing ethylene oxide and water; a carbon dioxide separation step 3 in which carbon dioxide is separated from the second mixture; and an electrolytic reduction step 4 in which the carbon dioxide is electrolytically reduced to obtain a fourth mixture containing ethylene, methane, and carbon dioxide and to obtain oxygen. In the carbon dioxide separation step, carbon dioxide is separated from the fourth mixture. In the ethylene oxide generation step, the second mixture and the fourth mixture, from which carbon dioxide has been removed, and the oxygen obtained in the electrolytic reduction step are used as raw material and a diluent gas.

8 Claims, 2 Drawing Sheets

(56) References Cited

FOREIGN PATENT DOCUMENTS

WO    2019225495  A1    11/2019

OTHER PUBLICATIONS

Extended European Search Report for European Patent Application No. 20952378.6 dated Apr. 24, 2024; 8 pp.
Ogura, Kotaro, "Electrochemical reduction of carbon dioxide to ethylene: Mechanistic approach," Journal of CO2 Utilization; vol. 1, 2013; pp. 43-49.
Wang, Mang et al., "Selective electrochemical reduction of carbon dioxide to ethylene on a copper hydroxide nitrate nanostructure electrode," Nanoscale, vol. 12, 2020; pp. 17013-17019.
Lee, Jae-Chan, et al., "Thermodynamically driven self-formation of copper-embedded nitrogen-doped carbon nanofiber catalysts for a cascade electroreductioin of carbon dioxide to ethylene," J. Mater. Chem. A, vol. 8, 2020; pp. 11632-11641.
International Search Report for Japanese Patent Application PCT/JP2020/033124 mailed Oct. 20, 2020; 3 pp.
Sen-I Gakkaishi, 1992, 48, 38-42, pp. 38, 39, etc.
International Preliminary Report on Patentability and Written Opinion for Japanese Patent Application No. PCT/JP2020/033124 issued Mar. 7, 2023; 6 pp.

METHOD FOR PRODUCING ETHYLENE OXIDE

CROSS-REFERENCE TO RELATED APPLICATION

This application is a U.S. national stage application of PCT/JP2020/033124, filed on Sep. 1, 2020, which is hereby expressly incorporated by reference in its entirety.

TECHNICAL FIELD

The present invention relates to a method for producing ethylene oxide.

BACKGROUND ART

As shown in Patent Document 1, there is known a method for producing ethylene oxide in which ethylene oxide is produced by catalytic oxidation of ethylene in a gas by using silver as a catalyst. In this producing method, ethylene is burned completely and a side reaction in which carbon dioxide is generated occurs. This side reaction is more likely to occur for a higher conversion rate of ethylene. Therefore, a circulation method in which the conversion rate of ethylene is lowered, and after ethylene oxide is collected from the reaction product, unreacted ethylene, oxygen, etc. are used again as the raw material is often adopted in the method for producing ethylene.

PRIOR ART DOCUMENT(S)

Patent Document(s)

Patent Document 1: JP2001-172272A

SUMMARY OF THE INVENTION

Task to be Accomplished by the Invention

Carbon dioxide contained in the reaction product is separated from ethylene oxide, ethylene, oxygen, etc., and part thereof is collected and used in food manufacturing, but most of it is released to the atmosphere. An amount of carbon dioxide discharged from the ethylene oxide producing process is large and is desired to be decreased from the viewpoint of global environment conservation.

In view of the foregoing background, an object of the present invention is to provide a method for producing ethylene oxide capable of reducing the emission amount of carbon dioxide.

Means to Accomplish the Task

To achieve the above object, one aspect of the present invention is a method for producing ethylene oxide, comprising: an ethylene oxide generation step (1) in which a first mixture containing ethylene oxide is obtained by causing a raw material containing ethylene and oxygen to react in presence of a diluent gas: a gas-liquid separation step (2) in which the first mixture is gas-liquid separated into a second mixture which is a gaseous component containing ethylene, oxygen, and carbon dioxide and a third mixture which is a liquid component containing ethylene oxide and water: a carbon dioxide separation step (3) in which carbon dioxide is separated from the second mixture; and an electrolytic reduction step (4) in which the carbon dioxide separated from the second mixture is electrolytically reduced to obtain a fourth mixture containing ethylene, methane, and unreacted carbon dioxide at a cathode and to obtain oxygen at an anode, wherein in the carbon dioxide separation step, carbon dioxide is further separated from the fourth mixture, and in the ethylene oxide generation step, the second mixture and the fourth mixture, from which carbon dioxide has been removed in the carbon dioxide separation step, and the oxygen obtained in the electrolytic reduction step are used as at least part of the raw material and the diluent gas.

According to this aspect, ethylene and oxygen which serve as the raw material of ethylene oxide can be generated by using the carbon dioxide generated when producing ethylene oxide. Therefore, the emission amount of carbon dioxide which is a greenhouse gas can be decreased considerably. Also, the raw material cost in the method for producing ethylene oxide can be lowered. Further, methane that is generated as a byproduct when generating ethylene from carbon dioxide can be used as a diluent gas to lower the oxygen concentration at the time of reaction of ethylene oxide, whereby the cost of the diluent gas can be lowered. Also, it is possible, by using the carbon dioxide separation step, to remove carbon dioxide from the fourth mixture generated from the cathode in the electrolytic reduction step.

In the above aspect, preferably, the fourth mixture is mixed into the second mixture before being processed in the carbon dioxide separation step.

According to this aspect, unreacted carbon dioxide can be removed from the fourth mixture generated in the electrolytic reduction step by making use of the carbon dioxide separation step.

In the above aspect, preferably, in the electrolytic reduction step, a catalyst loaded on the cathode is selected such that a selectivity of ethylene at the cathode is 30% or higher.

According to this aspect, it is possible to decrease the generation amount of methane by increasing the ratio of ethylene generated when electrolytically reducing carbon dioxide, whereby methane can be prevented from becoming excessive for the amount required as the diluent gas.

In the above aspect, preferably, an electrolytic reduction device (10) comprising: a cathode gas chamber (11) to which carbon dioxide in form of gas is supplied: a catholyte chamber (12) to which catholyte is supplied: an anolyte chamber (13) to which anolyte is supplied: a cathode (16) serving as a gas diffusion electrode that partitions the cathode gas chamber and the catholyte chamber from each other: a partition wall (17) which has an ion conductivity and partitions the catholyte chamber and the anolyte chamber from each other; and an anode (18) disposed in the anolyte chamber is used in the electrolytic reduction step.

According to this aspect, it is possible to avoid mixture of the fourth mixture containing ethylene and methane generated at the cathode and the unreacted carbon dioxide with the oxygen generated at the anode. Therefore, it is possible to omit a step for separating carbon dioxide from oxygen.

In the above aspect, preferably, the method further comprises a carbon monoxide removal step in which carbon monoxide is removed from the fourth mixture generated in the electrolytic reduction step. Also, preferably, in the carbon monoxide removal step, carbon monoxide is removed from the fourth mixture before carbon dioxide is removed in the carbon dioxide separation step.

According to this aspect, in such a case where the catalyst used in the ethylene oxide generation step is poisoned by carbon monoxide, this can be suppressed.

In the above aspect, preferably, the method further comprises an ethylene glycol generation step (6) in which ethylene glycol is generated by a hydration method from ethylene oxide contained in the third mixture.

According to this aspect, it is possible to generate ethylene glycol by using the generated ethylene oxide.

In the above aspect, preferably, in the electrolytic reduction step (4), carbon dioxide emitted from another plant is used as part of the carbon dioxide that is electrolytically reduced.

According to this aspect, the generation amount of ethylene and methane can be increased, and the raw material and the diluent gas can be further decreased.

In the above aspect, preferably, in the electrolytic reduction step (4), the carbon dioxide is electrolytically reduced by using electric power generated by natural energy.

According to this aspect, the emission amount of carbon dioxide can be suppressed.

Effect of the Invention

According to the foregoing aspect, a method for producing ethylene oxide capable of reducing the emission amount of carbon dioxide can be provided.

MODE(S) FOR CARRYING OUT THE INVENTION

Figure 1:
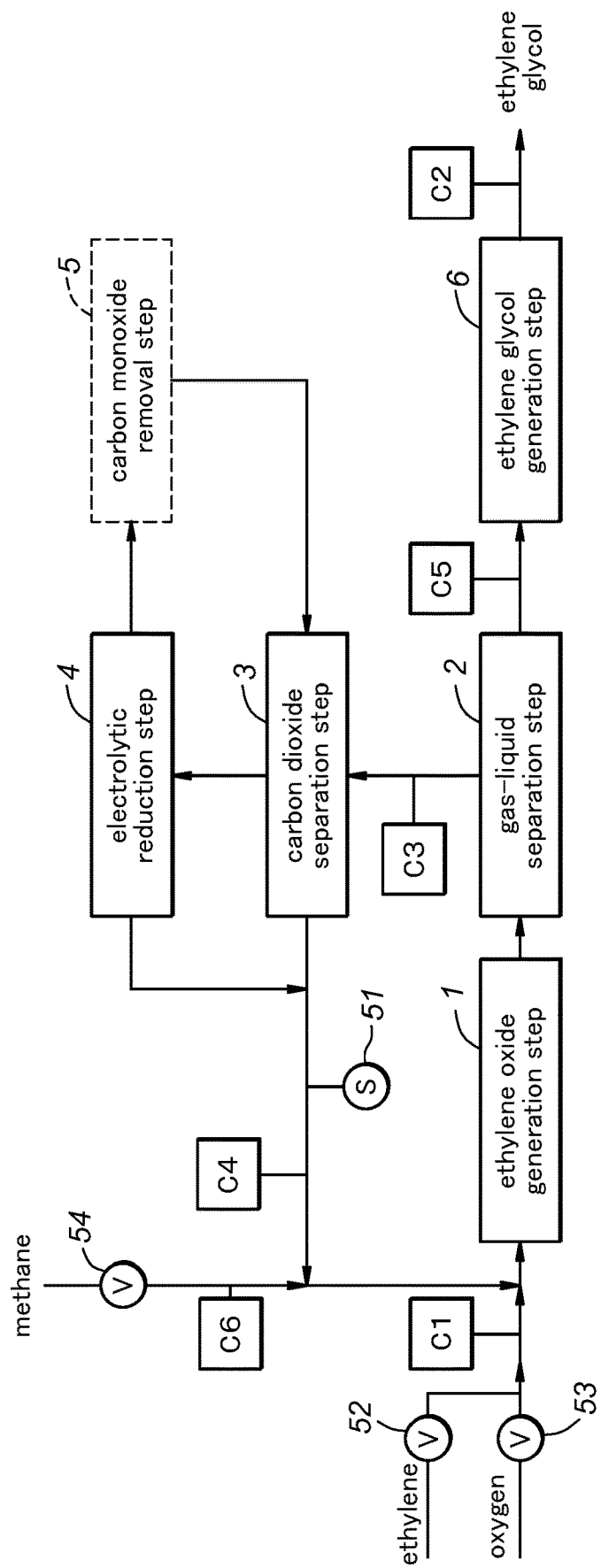
FIG. 1 is a schematic diagram showing a process for producing ethylene oxide and ethylene glycol.

In the following, an embodiment of a method for producing ethylene oxide according to the present invention will be described. As shown in FIG. 1, the method for producing ethylene oxide according to the embodiment includes: an ethylene oxide generation step 1 in which a first mixture containing ethylene oxide is obtained by causing a raw material containing ethylene and oxygen to react in presence of a diluent gas; a gas-liquid separation step 2 in which the first mixture is gas-liquid separated into a second mixture which is a gaseous component containing ethylene, oxygen, and carbon dioxide and a third mixture which is a liquid component containing ethylene oxide and water; a carbon dioxide separation step 3 in which carbon dioxide is separated from the second mixture; and a carbon dioxide electrolytic reduction step 4 in which the carbon dioxide separated from the second mixture is electrolytically reduced to obtain a fourth mixture containing ethylene, methane, and unreacted carbon dioxide at a cathode and to obtain oxygen at an anode. In the carbon dioxide separation step 3, unreacted carbon dioxide is further separated from the fourth mixture. Also, in the ethylene oxide generation step 1, the second mixture and the fourth mixture, from which carbon dioxide has been removed in the carbon dioxide separation step 3, and the oxygen obtained in the electrolytic reduction step 4 are used as at least part of the raw material and the diluent gas.

In the ethylene oxide generation step 1, the first mixture containing ethylene oxide is obtained by catalytic gas-phase oxidation of ethylene gas with oxygen gas in presence of a silver catalyst. Preferably, an ethylene oxidation reactor in which the ethylene oxide generation step 1 is performed is a multi-tubular reaction vessel filled with the silver catalyst, for example. Ethylene gas and oxygen gas, which serve as the raw material, and the diluent gas are heated and thereafter are supplied to the ethylene oxidation reactor. The diluent gas is used for the purpose of lowering the oxygen concentration in the ethylene oxidation reactor to suppress explosion. The diluent gas may be methane, nitrogen, or inert gas such as argon, for example. As an example, methane is used as the diluent gas in the present embodiment. The first mixture obtained from the ethylene oxidation reactor contains: ethylene oxide as a reaction product: unreacted ethylene and oxygen; methane as the diluent gas; and side reaction products including water, carbon dioxide, aldehydes such as formaldehyde and acetaldehyde, and organic acids such as acetic acid.

The silver catalyst preferably includes an alumina carrier and silver loaded on the alumina carrier. Preferably, the loading amount of silver is 15 to 35 wt %, for example. The silver catalyst preferably includes a promotor such as cesium, rhenium, tungsten, molybdenum, etc. Preferably, the reaction condition of the ethylene oxide generation step 1 is a temperature of 230 to 270° C., a pressure of 15 to 25 bar, and a GHSV (gas hourly space velocity) of 3000 to 8000 $hr^{-1}$, for example. Also, to suppress generation of carbon dioxide and water due to combustion of ethylene, which is a side reaction, the conversion rate of ethylene is preferably set to 8 to 15%.

In the gas-liquid separation step 2, the first mixture is cooled to a temperature higher than the freezing point of water (0° C.) and lower than the boiling point of ethylene oxide (10.7° C.) and thereafter is gas-liquid separated into a second mixture which is a gaseous component and a third mixture which is a liquid component. The second mixture contains ethylene, oxygen, and carbon dioxide. The third mixture contains water and ethylene oxide. Also, byproducts such as acetaldehyde and acetic acid are contained in the third mixture. In the gas-liquid separation step 2, preferably, a gas-liquid separation device such as a knockout drum, for example, is used.

In the carbon dioxide separation step 3, carbon dioxide is separated from the second mixture. Preferably, the separation of carbon dioxide is performed by a carbon dioxide separation device based on a known method which may be a chemical adsorption method such as Benfield method, MDEA (methyl diethanolamine) method, etc., a physical adsorption method such as Selexol method, Rectisol method, etc., a membrane separation method, a PSA method (pressure swing adsorption method), a PTSA method (pressure temperature swing adsorption method), etc. The carbon dioxide separated from the second mixture and adsorbed on various adsorbents is separated from the adsorbents in a regeneration process and becomes a highly concentrated gaseous state.

The second mixture after carbon dioxide is separated therefrom contains ethylene, oxygen, and methane. The gas containing ethylene, oxygen, and methane is returned to the ethylene oxide generation step 1 and is used as the raw material and the diluent gas for generating ethylene oxide.

In the carbon dioxide electrolytic reduction step 4, the carbon dioxide separated from the second mixture in the carbon dioxide separation step 3 is electrolytically reduced. In the electrolytic reduction step 4, preferably, an electrolytic reduction device using a gas diffusion electrode as a cathode, an electrolytic reduction device using a solid polymer membrane as a separator, or the like is used.

Figure 2:
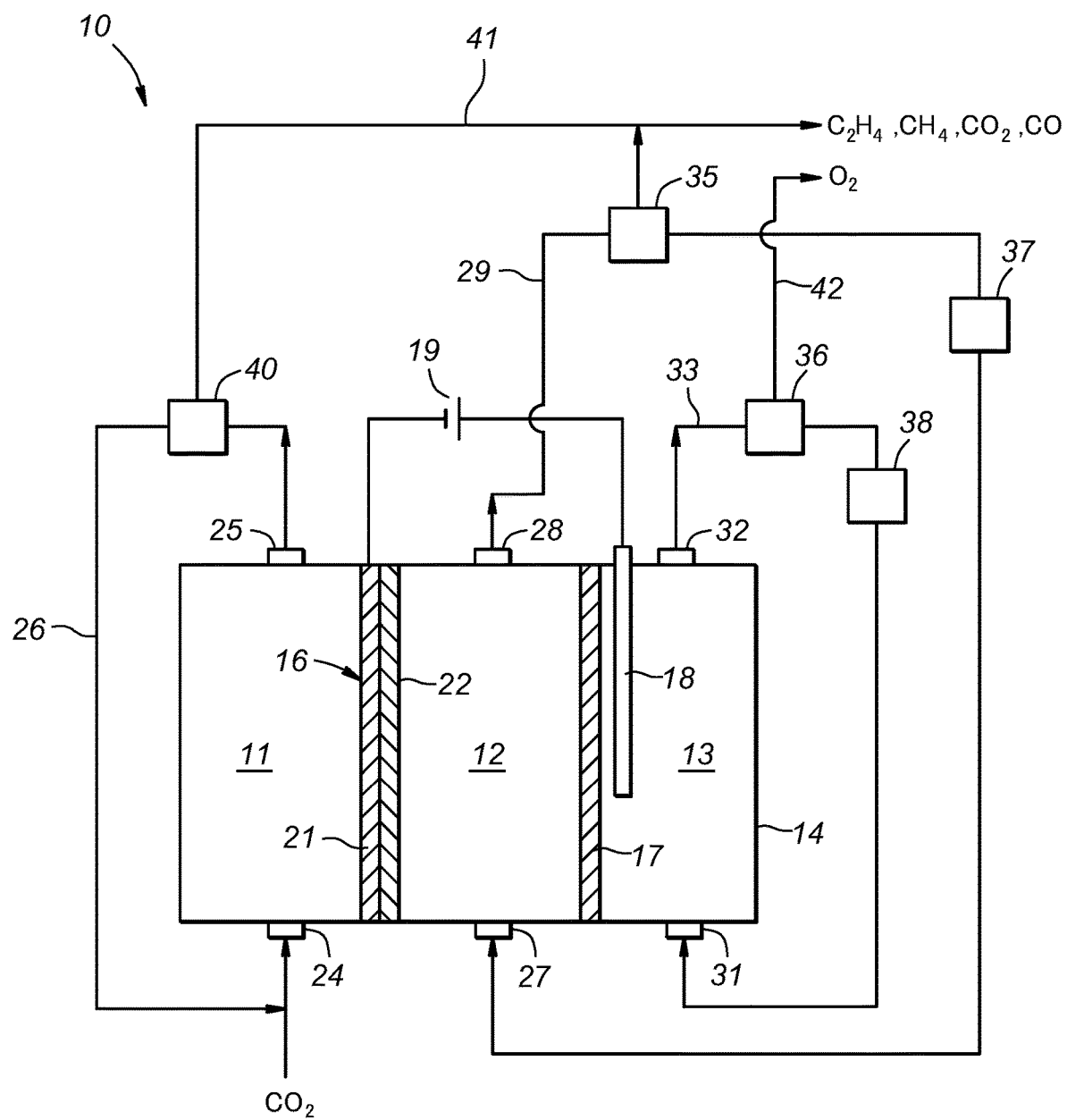
FIG. 2 is a schematic diagram showing an electrolytic reduction device.

As shown in FIG. 2, an electrolytic reduction device 10 used in the electrolytic reduction step 4 preferably is a three-chamber type electrolytic reduction device, for example. Specifically, the electrolytic reduction device 10 preferably includes an electrolytic cell 14 having a cathode gas chamber 11, a catholyte chamber 12, and an anolyte chamber 13 which are partitioned from each other. The cathode gas chamber 11 and the catholyte chamber 12 are partitioned by a cathode 16 as a gas diffusion electrode. The catholyte chamber 12 and the anolyte chamber 13 are partitioned by a partition wall 17 having ion conductivity. An anode 18 is disposed in the anolyte chamber 13. The cathode gas chamber 11 is supplied with carbon dioxide in form of gas separated in the gas-liquid separation step 2. The catholyte chamber 12 is supplied with a catholyte. The anolyte chamber 13 is supplied with an anolyte. The anode 18 and the cathode 16 are connected to a DC power supply 19.

The anolyte and the catholyte are aqueous solutions in which an electrolyte is dissolved. The electrolyte contains at least one of potassium, sodium, lithium, or compounds thereof. For example, the electrolyte preferably contains at least one member selected from the group consisting of $LiOH$, $NaOH$, $KOH$, $Li_2CO_3$, $Na_2CO_3$, $K_2CO_3$, $LiHCO_3$, $NaHCO_3$, and $KHCO_3$.

The cathode 16 is a gas diffusion electrode and includes a gas diffusion layer 21 and a micro porous layer 22. The gas diffusion layer 21 allows the gas containing carbon dioxide to pass therethrough but suppresses passing of an aqueous solution containing the catholyte. The micro porous layer 22 allows both the gas containing carbon dioxide and the aqueous solution containing the catholyte to pass therethrough. The gas diffusion layer 21 and the micro porous layer 22 are each formed in a planar shape. The gas diffusion layer 21 is disposed on the cathode gas chamber 11 side while the micro porous layer 22 is disposed on the catholyte chamber 12 side.

The gas diffusion layer 21 may be constituted by forming a water-repellent coating made of a material such as polytetrafluoroethylene, for example, on a surface of a porous, conductive base material such as a carbon paper, a carbon felt, or a carbon cloth, for example. The conductive base material is connected to the negative electrode of the DC power supply 19 and receives electrons supply. The micro porous layer 22 is formed on a surface of the gas diffusion layer 21 by using carbon black or the like, and having a catalyst loaded thereon. The catalyst may be a known carbon dioxide reduction catalyst and contains, for example, at least one of an 11th group element such as copper, a 12th group element such as zinc, a 13th group element such as gallium, a 14th group element such as germanium, or metal compounds thereof. The metal compounds contain at least one of an oxide, a sulfide, and a phosphide. Preferably, the catalyst is the one suitable for reducing carbon dioxide to generate ethylene, and copper or a copper compound is preferable, for example. A binder such as an ion exchange resin may be added to the micro porous layer 22.

The anode 18 is, for example, a metal material such as titanium, nickel, molybdenum, platinum, gold, silver, copper, iron, lead, etc., a metal alloy material thereof, a carbon-based material such as carbon or a conductive ceramic. The shape of the anode 18 may be a flat plate, a flat plate with multiple openings, a mesh, or a porous body. The shape of the openings formed in the flat plate may be a circle, a rhombus, a star, etc. The flat plate may be formed in a waveform or in a curved manner, and may have irregularities on the surface. The anode 18 has an oxygen generating catalyst such as platinum or iridium loaded thereon. The anode 18 may be provided on the anolyte chamber 13-side surface of the partition wall 17.

The DC power supply 19 converts the electric power obtained by thermal power generation, nuclear power generation, solar power generation, wind power generation, hydroelectric power generation, etc. to direct current as necessary and supplies it to the cathode 16 and the anode 18. From the viewpoint of decreasing the carbon dioxide emission, it is preferred to use, as the DC power supply 19, the electric power obtained by solar power generation, wind power generation, hydroelectric power generation, etc. which uses natural energy (renewable energy). The DC power supply 19 applies a voltage such that the cathode 16 has a negative electric potential with respect to the anode 18. Preferably, the DC power supply 19 acquires the electric potential of the cathode 16 by using a reference electrode and controls the applied voltage so that the electric potential of the cathode 16 is within a predetermined range.

The cathode gas chamber 11 has an inlet 24 and an outlet 25. The carbon dioxide gas supplied from the carbon dioxide separation step 3 is supplied through the inlet 24 and is discharged from the outlet 25. The outlet 25 of the cathode gas chamber 11 is connected to the inlet 24 via a gas circulation path 26.

The catholyte chamber 12 has an inlet 27 and an outlet 28. The inlet 27 and the outlet 28 of the catholyte chamber 12 are connected by a catholyte circulation path 29. Similarly, the anolyte chamber 13 has an inlet 31 and an outlet 32. The inlet 31 and the outlet 32 of the anolyte chamber 13 are connected by an anolyte circulation path 33. The catholyte circulation path 29 is provided with a cathode-side gas-liquid separation device 35. The anolyte circulation path 33 is provided with an anode-side gas-liquid separation device 36. Also, the catholyte circulation path 29 and the anolyte circulation path 33 are preferably provided with electrolyte concentration control devices 37, 38 for adjusting the electrolyte concentrations in the catholyte and the anolyte in predetermined ranges, respectively. The electrolyte concentration control devices 37, 38 preferably include sensors that detect the electrolyte concentrations in the catholyte and the anolyte, electrolyte liquid suppliers that supply new catholyte and anolyte with predetermined concentrations, and drainage devices for discharging part of the circulating catholyte and anolyte, respectively.

Further, the gas circulation path 26 is provided with a gas circulation flow rate adjustment device 40 that discharges part of the gas circulating inside. An outlet of the gas circulation flow rate adjustment device 40 is connected to a first gas return passage 41. A gas discharge passage of the cathode-side gas-liquid separation device 35 is connected to the first gas return passage 41. The gas circulation flow rate adjustment device 40 adjusts the flow rate and the pressure of the gas circulating in the gas circulation path 26 and the cathode gas chamber 11 by discharging the gas to the first gas return passage 41. Due to the gas circulation flow rate adjustment device 40, the gas pressure in the cathode gas chamber 11 is maintained to be higher than the liquid pressure in the catholyte chamber 12 by a predetermined value. Thereby, the catholyte in the catholyte chamber 12 is prevented from passing through the cathode 16 and flowing into the cathode gas chamber 11. Part of the gas in the cathode gas chamber 11 passes through the cathode 16 and flows into the catholyte chamber 12. Preferably, the amount of gas flowing from inside the cathode gas chamber 11 to the catholyte chamber 12 is small.

The carbon dioxide in the cathode gas chamber 11 diffuses into the inside of the gas diffusion layer 21 of the cathode 16 and is reduced in the micro porous layer 22, whereby the fourth mixture is obtained. The fourth mixture contains ethylene and methane as main products and contains a small amount of byproducts such as hydrogen, carbon monoxide, formic acid, etc. Most part of the fourth mixture is generated on the cathode gas chamber 11 side of the cathode 16. Note that part of the fourth mixture is generated on the catholyte chamber 12 side of the cathode 16. Unreacted carbon dioxide flowing into the catholyte chamber 12 is mixed into the fourth mixture in the catholyte chamber 12. Similarly, unreacted carbon dioxide is mixed into the fourth mixture in the cathode gas chamber 11.

In the fourth mixture generated on the catholyte chamber 12 side of the cathode 16, ethylene and methane as well as hydrogen and carbon monoxide, which are byproducts, are gases, and are separated from the catholyte together with the unreacted carbon dioxide by the cathode-side gas-liquid separation device 35 in the catholyte circulation path 29 so that they flow into the first gas return passage 41. The formic acid in the fourth mixture is a liquid, circulates in the catholyte circulation path 29 together with the catholyte, and is discharged from the electrolyte concentration control device 37 together with the catholyte.

In the fourth mixture generated on the cathode gas chamber 11 side of the cathode 16, ethylene and methane as well as hydrogen and carbon monoxide, which are byproducts, circulate in the gas circulation path 26 together with unreacted carbon dioxide and are discharged from the gas circulation flow rate adjustment device 40 to the first gas return passage 41. The fourth mixture which contains ethylene and methane generated on the catholyte chamber 12 side of the cathode 16, hydrogen and carbon monoxide which are byproducts, and unreacted carbon dioxide flows to the first gas return passage 41 from the cathode-side gas-liquid separation device 35 and the gas circulation flow rate adjustment device 40.

At the anode 18, water and hydroxide ion in the anolyte are oxidized, whereby oxygen is generated. The oxygen is a gas and is separated from the anolyte by the anode-side gas-liquid separation device 36 in the anolyte circulation path 33 so that the separated oxygen flows to the second gas return passage 42.

In the electrolytic reduction step 4, the catalyst loaded on the cathode 16 is preferably selected such that the selectivity for the generation of ethylene at the cathode 16 is 30% or higher.

The fourth mixture containing ethylene and methane generated at the cathode 16 in the carbon dioxide electrolytic reduction step 4 is supplied to the carbon dioxide separation step 3 via the first gas return passage 41, and carbon dioxide is removed therefrom. The fourth mixture containing ethylene and methane may contain carbon monoxide and hydrogen, and in such a case, the fourth mixture may be supplied to a carbon monoxide removal step 5 to remove carbon monoxide therefrom before being supplied to the carbon dioxide separation step 3. In the carbon monoxide removal step 5, carbon monoxide may be adsorbed by using an adsorbent using zeolite or the like, for example. Note that the carbon monoxide removal step 5 is not an essential configuration and may be omitted. Also, the fourth mixture containing ethylene and methane may be supplied to a hydrogen removal step to remove hydrogen therefrom before being supplied to the carbon dioxide separation step 3. As the hydrogen removal step, a pressure swing adsorption (PSA) or the like may be applied, for example. Note that the hydrogen removal step is not an essential configuration and may be omitted. Preferably, the fourth mixture supplied from the first gas return passage 41 is mixed into the second mixture supplied from the gas-liquid separation step 2 to the carbon dioxide separation step 3. Thereby, after carbon dioxide is removed in the gas-liquid separation step 2, the fourth mixture is returned to the ethylene oxide generation step 1 together with the second mixture and is used as part of the raw material and the diluent gas.

The oxygen supplied from the second gas return passage 42, namely, the oxygen generated from the anode 18 in the electrolytic reduction step 4, is returned to the ethylene oxide generation step 1 and is used as part of the raw material. Preferably, the oxygen generated from the anode 18 in the electrolytic reduction step 4 is mixed into the second mixture and the fourth mixture from which carbon dioxide has been removed in the carbon dioxide separation step 3, and thereafter is returned to the ethylene oxide generation step 1.

A sensor 51 that detects the flow rate of each component of the gas supplied from the carbon dioxide separation step 3 and the second gas return passage 42 may be provided. Also, a control device not shown in the drawings may control, based on the detection values of the sensor 51, flow control valves 52, 53, 54 respectively controlling the flow rates of ethylene, oxygen, and methane that are newly supplied to the ethylene oxide generation step 1, thereby to adjust the flow rate of each of ethylene, oxygen, and methane supplied to the ethylene oxidation reactor in the ethylene oxide generation step 1.

The third mixture which contains ethylene oxide and water separated from the first mixture in the gas-liquid separation step 2 is used as raw material in an ethylene glycol generation step 6. In the ethylene glycol generation step 6, ethylene oxide is hydrolyzed in presence of a catalyst, namely, according to the hydration method, thereby to generate ethylene glycol. Preferably, the catalyst is a resin catalyst such as, for example, "Amberlist" (registered trademark), "Doulit" (registered trademark), "DOWEX" (registered trademark) or the like. In the ethylene glycol generation reaction, preferably, the reaction temperature is 100 to 120° C. and the reaction pressure is 20 to 35 bar.

Effects of the above embodiment will be described. According to the method for producing ethylene oxide of the embodiment, ethylene and oxygen which serve as the raw material of ethylene oxide can be generated by using the carbon dioxide generated when producing ethylene oxide. Therefore, the emission amount of carbon dioxide which is a greenhouse gas can be decreased. Also, the raw material cost in the method for producing ethylene oxide can be lowered. Further, methane that is generated as a byproduct when generating ethylene from carbon dioxide can be used as a diluent gas to lower the oxygen concentration at the time of reaction of ethylene oxide, whereby the cost of the diluent gas can be lowered.

In the carbon dioxide electrolytic reduction step 4, by making arrangement such that the Faraday efficiency for the generation of ethylene at the cathode 16 is 30% or higher, it is possible to decrease the generation amount of methane generated when electrolytically reducing carbon dioxide, whereby methane can be prevented from becoming excessive for the amount required as the diluent gas.

In the following, examples of the above embodiment will be described.

Example 1

An example of the ethylene oxide generation step 1 will be described. A fixed bed reactor filled with about 30 cc of catalyst prepared by loading 20 wt % silver on a alumina and further adding 3 wt % rhenium as a promotor was used. A gas containing 25 mol % ethylene, 10 mol % oxygen, and 65 mol % methane was supplied to the reactor under a condition with a temperature of 250° C., a pressure of 20 bar, and GHSV=5000 hr$^{-1}$. The ratios of the reaction products obtained from the outlet of the reactor were ethylene 22.6 mol %, oxygen 3.7 mol %, methane 65.9 mol %, ethylene oxide 2.1 mol %, carbon dioxide 2.3 mol %, and water 3.4 mol %.

Example 2

An example of the carbon dioxide absorption method in the carbon dioxide separation step 3 will be described. A gas absorption bottle made of glass was immersed in a constant temperature water bath set to make the liquid temperature 40° C., and this was filled with 50 mL of aqueous solution containing 18.8 wt % of N-methyl diethanolamine and 31.2 wt % of piperazine. Into this liquid, a mixed gas containing 20 wt % of carbon dioxide and 80 wt % of nitrogen was dispersed in bubbles under atmospheric pressure and at 0.7 L/min so that absorption took place. The carbon dioxide concentration in the gas was measured at the absorption liquid inlet and at the absorption liquid outlet, and the carbon dioxide absorption amount was measured from a difference in the carbon dioxide flow rate between the inlet and the outlet. The saturated absorption amount was measured as an amount at the time point when the carbon dioxide concentration at the absorption liquid outlet matched the carbon dioxide concentration at the inlet. The carbon dioxide saturated absorption amount was 115.7 g/L. Subsequently, the liquid temperature was raised to 70° C. in a few minutes in the same gas stream, and a desorption amount and a desorption rate of carbon dioxide from the liquid were measured. The desorption amount of carbon dioxide was 25.4 g/L, and the desorption rate was 2.05 g/L/min.

Example 3

An example of the carbon dioxide electrolytic reduction step 4 will be described. The electrolytic reduction device 10 including the cathode gas chamber 11, the catholyte chamber 12, and the anolyte chamber 13 described above was used. The catalyst in the gas diffusion layer 21 of the cathode 16 was a copper-zinc complex catalyst. The anode 18 was a titanium plate on which an iridium oxide catalyst was loaded. As the anolyte and the catholyte, 1M potassium bicarbonate solution was made to flow at 1 mL/min. While carbon dioxide was made to flow at 100 mL/min in the cathode gas chamber 11, energization was conducted for 6 hours with electric current at 300 mA/cm$^2$. Analysis of the components of the gas generated from the catholyte chamber 12 showed that the ethylene selectivity was 53%, the methane selectivity was 18%, and the hydrogen selectivity was 20% at the cathode 16. Analysis of the components of the gas generated from the anolyte chamber 13 showed that the oxygen selectivity was 99% at the anode 18.

Example 4

A calculation result of a mass balance in a case where ethylene glycol is produced at 100 ton/hr in a plant using the above-described method for producing ethylene oxide is shown in Table 1 below. As shown in FIG. 1, the composition of the raw material for the ethylene oxide generation step 1 newly added from outside the system is represented by C1, the composition of the product of the ethylene glycol generation step 6 is represented by C2, the composition of the material supplied from the carbon dioxide separation step 3 to the electrolytic reduction step 4 is represented by C3, the composition of the mixture of the oxygen from the electrolytic reduction step 4 with the second mixture and the fourth mixture from which carbon dioxide has been removed by the carbon dioxide separation step 3 is represented by C4, the composition the material supplied to the ethylene glycol generation step 6 is represented by C5, and the composition of the diluent gas for the ethylene oxide generation step 1 newly added from outside the system is represented by C6. As the calculation condition of the mass balance, the outlet temperature of the ethylene oxidation reactor in the ethylene oxide generation step 1 was set to 250° C. and the outlet pressure of the same was set to 20 bar. Also, In the absorption of carbon dioxide in the carbon dioxide separation step 3, a chemical absorption method using an aqueous solution containing 18.8 wt % of N-methyl diethanolamine and 31.2 wt % of piperazine was used. The reaction condition of the reactor in the ethylene glycol generation step 6 was a reaction temperature of 100° C. and a pressure of 25 bar. The reaction condition in the carbon dioxide electrolytic reduction step 4 was a conversion rate of carbon dioxide of 70%, an ethylene selectivity at the cathode 16 of 80%, and a methane selectivity at the cathode 16 of 20%.

TABLE 1

| No. | C1 | C2 | C3 | C4 | C5 | C6 |
|---|---|---|---|---|---|---|
| | | | | | (unit: ton/hr) | |
| $CH_4$ | 0 | 0 | 0.1 | 0.1 | 0 | 2.4 |
| $H_2O$ | 0 | 0 | 0 | 0 | 34 | 0 |
| $C_2H_4$ | 51.9 | 0 | 0 | 3.4 | 0 | 0 |
| $O_2$ | 29.2 | 0 | 0 | 15.7 | 0 | 0 |
| $CO_2$ | 0 | 0 | 17.5 | 0 | 0 | 0 |
| ethylene oxide | 0 | 0 | 0 | 0 | 3.2 | 0 |
| acetaldehyde | 0 | 0 | 0 | 0 | 0 | 0 |
| ethylene glycol | 0 | 100 | 0 | 0 | 0 | 0 |
| diethylene glycol | 0 | 3.2 | 0 | 0 | 0 | 0 |
| triethylene glycol | 0 | 0.2 | 0 | 0 | 0 | 0 |
| total | 81.1 | 103.4 | 17.6 | 19.2 | 37.2 | 2.4 |

A concrete embodiment has been described in the foregoing, but the present invention is not limited to the above embodiment and may be modified or altered in various ways. The second gas return passage 42 may be connected to the first gas return passage 41. In this case, the oxygen generated at the anode 18 is mixed with the fourth mixture generated at the cathode 16 and, after carbon dioxide is separated in the carbon dioxide separation step 3, is returned to the ethylene oxide generation step 1.

As the electrolytic reduction device 10, various known electrolytic reduction devices may be used. For example, in the electrolytic reduction device 10, the cathode gas chamber 11 may be omitted and the cathode 16 may be disposed in the catholyte chamber 12. In this case, carbon dioxide gas may be blown into the catholyte by bubbling near the cathode 16. Also, carbon dioxide gas may be dissolved in the catholyte.

The carbon dioxide electrolytic reduction step 4, carbon dioxide emitted from another plant may be used as part of the carbon dioxide that is electrolytically reduced. The generation amount of ethylene and methane can be increased.

LIST OF REFERENCE NUMERALS

1: ethylene oxide generation step
2: gas-liquid separation step
3: carbon dioxide separation step 4: electrolytic reduction step
5: carbon monoxide separation step
6: ethylene glycol generation step
10: electrolytic reduction device
11: cathode gas chamber
12: catholyte chamber
13: anolyte chamber
14: electrolytic cell
16: cathode
17: partition wall
18: anode
19: DC power supply
24: inlet
25: outlet
26: gas circulation path
27: inlet
28: outlet
29 catholyte circulation path
31: inlet
32: outlet
33 anolyte circulation path
35: cathode-side gas-liquid separation device
36: anode-side gas-liquid separation device
37: electrolyte concentration control device
38: electrolyte concentration control device
40: gas circulation flow rate adjustment device
41: first gas return passage
51: sensor
52: flow control valve
53: flow control valve
54: flow control valve

What is claimed is:

1. A method for producing ethylene oxide, comprising:
an ethylene oxide generation step in which a first mixture containing ethylene oxide is obtained by causing a raw material containing ethylene and oxygen to react in presence of a diluent gas;
a gas-liquid separation step in which the first mixture is gas-liquid separated into a second mixture which is a gaseous component containing ethylene, oxygen, and carbon dioxide and a third mixture which is a liquid component containing ethylene oxide and water;
a carbon dioxide separation step in which carbon dioxide is separated from the second mixture; and
a carbon dioxide electrolytic reduction step in which the carbon dioxide separated from the second mixture is electrolytically reduced to obtain a fourth mixture containing ethylene, methane, and unreacted carbon dioxide at a cathode and to obtain oxygen at an anode,
wherein in the carbon dioxide separation step, carbon dioxide is further separated from the fourth mixture,
in the ethylene oxide generation step, the second mixture and the fourth mixture, from which carbon dioxide has been removed in the carbon dioxide separation step, and the oxygen obtained in the electrolytic reduction step are used as at least part of the raw material and the diluent gas,
the fourth mixture is mixed into the second mixture before being processed in the carbon dioxide separation step, and
the oxygen generated from the anode in the carbon dioxide electrolytic reduction step is mixed into the second mixture and the fourth mixture from which carbon dioxide has been removed in the carbon dioxide separation step, and thereafter is returned to the ethylene oxide generation step.

2. The method for producing ethylene oxide according to claim 1, wherein in the electrolytic reduction step, a copper-zinc complex catalyst loaded on the cathode is selected such that a selectivity of ethylene at the cathode is 30% or higher.

3. The method for producing ethylene oxide according to claim 1, wherein an electrolytic reduction device comprising: a cathode gas chamber to which carbon dioxide in form of gas is supplied; a catholyte chamber to which catholyte is supplied; an anolyte chamber to which anolyte is supplied; a cathode serving as a gas diffusion electrode that partitions the cathode gas chamber and the catholyte chamber from each other; a partition wall which has an ion conductivity and partitions the catholyte chamber and the anolyte chamber from each other; and an anode disposed in the anolyte chamber is used in the electrolytic reduction step.

4. The method for producing ethylene oxide according to claim 1, further comprising a carbon monoxide removal step in which carbon monoxide is removed from the fourth mixture generated in the electrolytic reduction step.

5. The method for producing ethylene oxide according to claim 4,
wherein in the carbon monoxide removal step, carbon monoxide is removed from the fourth mixture before carbon dioxide is removed in the carbon dioxide separation step.

6. The method for producing ethylene oxide according to claim 1, further comprising an ethylene glycol generation step in which ethylene glycol is generated by a hydration method from ethylene oxide contained in the third mixture.

7. The method for producing ethylene oxide according to claim 1, wherein in the electrolytic reduction step, carbon dioxide emitted from another plant is used as part of the carbon dioxide that is electrolytically reduced.

8. The method for producing ethylene oxide according to claim 1, wherein in the electrolytic reduction step, carbon dioxide is electrolytically reduced by using electric power generated by at least one of solar power generation, wind power generation, or hydroelectric power generation.

* * * * *